United States Patent
Earl et al.

(12) 
(10) Patent No.: US 6,966,058 B2
(45) Date of Patent: Nov. 15, 2005

(54) SYSTEM AND METHOD FOR MANAGING SOFTWARE UPGRADES IN A DISTRIBUTED COMPUTING SYSTEM

(75) Inventors: William J. Earl, Boulder Creek, CA (US); Terry G. Hahn, Los Altos, CA (US); Dhanabal Ekambaram, Fremont, CA (US)

(73) Assignee: Agami Systems, Inc., San Jose, CA (US)

( * ) Notice: Subject to any disclaimer, the term of this patent is extended or adjusted under 35 U.S.C. 154(b) by 0 days.

(21) Appl. No.: 10/170,881

(22) Filed: Jun. 12, 2002

(65) Prior Publication Data

US 2003/0233648 A1 Dec. 18, 2003

(51) Int. Cl.[7] .............................................. G06F 9/44
(52) U.S. Cl. ...................... 717/171; 717/176; 709/223; 714/1
(58) Field of Search ................................. 717/168–178; 707/200, 203; 714/47, 1; 709/223

(56) References Cited

U.S. PATENT DOCUMENTS

| | | | | |
|---|---|---|---|---|
| 5,664,186 A | * | 9/1997 | Bennett et al. ............. 707/204 |
| 5,717,917 A | * | 2/1998 | Munakata ....................... 707/8 |
| 5,742,829 A | * | 4/1998 | Davis et al. ................. 717/178 |
| 5,754,785 A | * | 5/1998 | Lysik et al. .................. 709/222 |
| 5,859,969 A | * | 1/1999 | Oki et al. .................... 709/200 |
| 6,080,207 A | * | 6/2000 | Kroening et al. ........... 717/172 |
| 6,105,073 A | * | 8/2000 | Choung ....................... 709/321 |
| 6,324,692 B1 | * | 11/2001 | Fiske .......................... 717/171 |
| 6,349,408 B1 | * | 2/2002 | Smith .......................... 717/174 |
| 6,529,938 B1 | * | 3/2003 | Cochran et al. ............. 709/203 |
| 6,560,614 B1 | * | 5/2003 | Barboy et al. .............. 707/201 |
| 6,594,735 B1 | * | 7/2003 | Baker et al. ................. 711/147 |

OTHER PUBLICATIONS

PCT Written Opinion dated Apr. 20, 2004 corresponding to PCT/US03/18619 filed on Jun. 11, 2003.

* cited by examiner

*Primary Examiner*—Antony Nguyen-Ba
(74) *Attorney, Agent, or Firm*—DLA Piper Rudnick Gray Cary US LLP

(57) ABSTRACT

A system and method for managing software upgrades in a distributed computing system. The distributed computing system may include a plurality of nodes which provide one or more fault-tolerant services. The system and method perform software upgrades in a sequential or "rolling" manner (e.g., node by node). The rolling upgrade process allows all services and data of the distributed computing system to remain operable and available throughout the upgrade process.

19 Claims, 4 Drawing Sheets

SYSTEM AND METHOD FOR MANAGING SOFTWARE UPGRADES IN A DISTRIBUTED COMPUTING SYSTEM

TECHNICAL FIELD

The present invention relates generally to distributed computing systems, and more particularly to a system and method for managing software upgrades and downgrades in a highly scalable, distributed computing system. The present invention performs sequential or "rolling" software upgrades in a distributed computing system in a manner that allows the entire system to remain operable and available during the upgrade process.

BACKGROUND OF THE INVENTION

Distributed computing systems, such as distributed file systems, typically include several system severs or components that are interconnected through a network. The various servers and components of the system run software that controls and manages the various operations of the computing system. Periodically, new upgrades, releases, additions or patches may be created for the software running on the system. For the system to operate properly, this new software must be loaded onto all of the servers and components of the system.

In order to upgrade the currently running software in any prior distributed computing system, the system is temporarily shut down and/or made unavailable. Once the system is stopped, the software upgrades, releases, additions and/or patches are loaded onto all system components, and the system is rebooted. This process undesirably causes the distributed computing system to be inoperable or unavailable for significant periods of time during the upgrade process (i.e., until the upgrade is complete throughout the system), thereby depriving users of the system from accessing and operating the system until the upgrade is complete.

It is therefore desirable to provide a system and method for managing software upgrades in a distributed computing system, which performs software upgrades in the distributed computing system, while allowing the system to remain operable and accessible throughout the upgrade process. Accordingly, the present invention provides a system and method for managing software in a distributed computing system having a plurality of nodes, which performs software upgrades in a sequential or "rolling" manner (e.g., node by node), thereby allowing the distributed computing system to remain operable and available throughout the upgrade process.

SUMMARY OF THE INVENTION

One non-limiting advantage of the present invention is that it provides a system and method for managing software upgrades in a distributed computing system, which performs software upgrades in a sequential or rolling manner, such that the distributed computing system remains accessible throughout the upgrade process.

Another non-limiting advantage of the present invention is that it provides a system and method for performing rolling software upgrades in a distributed file system having multiple components or resources.

Another non-limiting advantage of the present invention is that it performs rolling upgrades on a distributed computing system by installing a software release on a boot server and then, one by one, rebooting the various components of the system with the new software. The system assigns a "protected" status to any fault-tolerant component that has a "mirror" or duplicate component that is temporarily unavailable. The system will not reboot any protected components until their fault-tolerant status is recovered.

Another non-limiting advantage of the present invention is that it provides a rolling software upgrade model for a distributed computing system that also supports rolling downgrades releases, to back out of an upgrade which proves undesirable or unsatisfactory.

According to one aspect of the present invention, a system is disclosed for managing a software upgrade in a distributed computing system having a plurality of nodes that provide at least one fault-tolerant service. The system includes at least one server which is communicatively connected to the plurality of nodes and which is adapted to receive a software release, and to upgrade each of the plurality of nodes with the software release in a sequential manner, whereby the at least one fault-tolerant service remains available while the software upgrade is in progress.

According to a second aspect of the invention, a method is provided for managing a software upgrade in a distributed computing system having a plurality of nodes that provide at least one fault-tolerant service. The method includes the steps of: receiving a new software release; and upgrading each of the plurality of nodes with the new release in a sequential manner, whereby the at least one fault-tolerant service remains available while the software upgrade is in progress.

According to a third aspect of the present invention, a method is provided for managing a software upgrade in a distributed file system having a plurality of nodes that provide a plurality of fault-tolerant services. The method includes the steps of: receiving a new software release; determining whether the new software release is compatible with a current release running on the distributed file system; initiating a rolling upgrade process if the new release is compatible; performing the rolling upgrade process by sequentially loading and rebooting each of the plurality of nodes with the new software release; and ensuring that the plurality of fault-tolerant services remains available throughout the rolling upgrade process.

These and other features and advantages of the invention will become apparent by reference to the following specification and by reference to the following drawings.

DETAILED DESCRIPTION OF THE EMBODIMENTS

The present invention will now be described in detail with reference to the drawings, which are provided as illustrative examples of the invention so as to enable those skilled in the art to practice the invention. The present invention may be implemented using software, hardware, and/or firmware or any combination thereof, as would be apparent to those of ordinary skill in the art. The preferred embodiment of the present invention will be described herein with reference to an exemplary implementation of a fault-tolerant distributed file storage system. However, the present invention is not limited to this exemplary implementation, but can be practiced in any distributed computing system that includes multiple hosts, resources or components that run software that may be upgraded periodically.

I. General System Architecture

Figure 1:
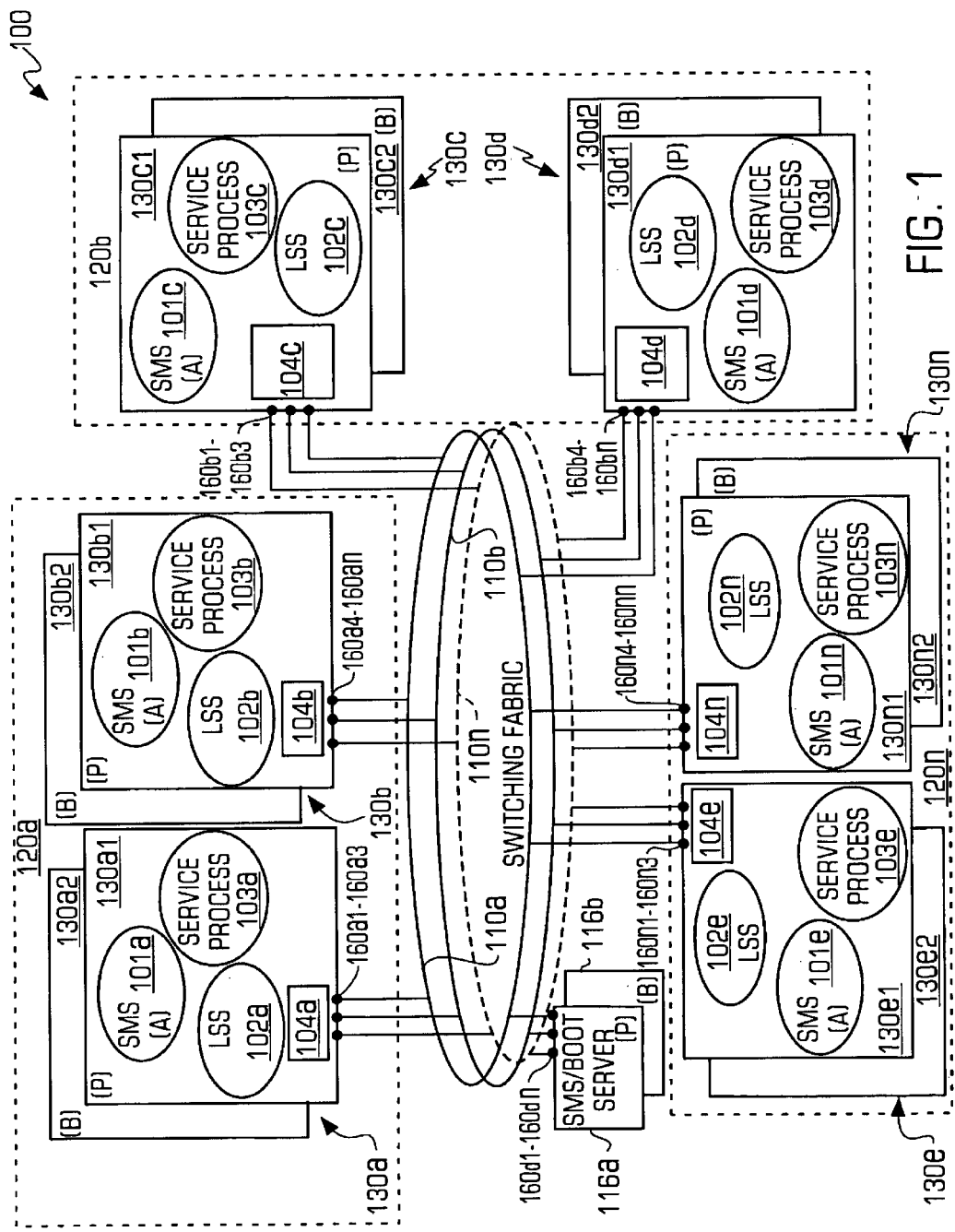
FIG. 1 is a block diagram of an exemplary distributed computing system incorporating one embodiment of a system and method for managing software upgrades on the distributed computing system.

Referring now to FIG. 1, there is shown an exemplary highly scalable, distributed computing system 100 incorporating a system and method for managing software upgrades, according to one embodiment of the invention. The distributed computing system 100 has a plurality of resources, including service nodes 130a–130n and a Systems Management Server (SMS)/boot server pair 116a, 116b. Each SMS/boot server 116a, 116b may comprise a conventional server, computing system or a combination of such devices. Each SMS/boot server 116a, 116b includes a configuration database (CDB) 114a, 114b, which stores state and configuration information relating to the system 100. The CDB 114a, 114b may include a "hosts" section that stores the attributes and status of each of the nodes of the system 100, including the identity of the software release(s) that is operating on each of the nodes. One of the SMS server pair 116a, 116b (e.g., SMS/boot server 116a) may serve as the primary SMS/boot server, while the other (e.g., SMS/boot server 116b) may act as a backup, which is adapted to perform the same functions as the primary SMS/boot server in the event that the primary SMS/boot server is unavailable. The SMS/boot server pair 116a, 116b each includes hardware, software and/or firmware that is adapted to perform system management services. Particularly, the SMS/boot server pair 116a, 116b is responsible for management services such as starting, stopping, and rebooting service nodes, and for managing software upgrades on the various nodes of the system 100. SMS/boot server pair 116a, 116b may also perform management services, such as the resource provisioning, configuration and allocation services described in co-pending U.S. Patent Application, entitled "System and Method for Managing a Distributed Computing System," which is assigned to the present assignee and which is fully and completely incorporated herein by reference.

It should be appreciated that in alternate embodiments the SMS/boot server pair 116a, 116b may comprise a plurality of disparate devices that perform one or more of the foregoing functions. For example, the system may include separate dedicated boot servers and/or separate dedicated SMS servers. In the following discussion, the SMS/boot server pair 116a, 116b may be collectively referred to as the SMS/boot server 116, and the CDB pair 114a, 114b may be collectively referred to as the CDB 114. Furthermore, the term "n" is used herein to indicate an indefinite plurality, so that the number "n" when referred to one component does not necessarily equal the number "n" of a different component. For example, the number of service nodes 130a–130n need not, but may, equal the number of services 120a–120n.

Each service node 130a–130n within system 100 is connected by use of an interface (e.g., 160a1–160an, 160b1–160bn, 160n1–160nn) to at least a pair of switching fabrics 110a–110n, which may comprise for example, but without limitation, switched Internet Protocol (IP) based networks, buses, wireless networks or other suitable interconnect mechanisms. Switching fabrics 110a–110n can provide connectivity to any number of service nodes, boot servers, and/or function-specific servers such as the SMS/boot server pair 116a, 116b.

In the preferred embodiment, each service node 130a–130n in system 100 may include at least one service process 103a–103n, which can be, for example but without limitation, a gateway process, metadata process, or storage process for a file system. Each service node 130a–130n provides a fault-tolerant service and preferably includes a primary service instance (e.g., service nodes 130a1–n1) and one or more backup service instances (e.g., service nodes 130a2–n2). The primary service instance and its one or more backup service instances are substantially identical (e.g., have substantially identical components, functions and content), and in most cases reside on separate physical machine to ensure independent failure, thereby avoiding the primary service instance and its one or more backup service instances failing together. The primary and backup services may maintain fault-tolerance using a suitable checkpointing technique, such as that described in U.S. patent application Ser. No. 09/997,877, entitled "Fault Tolerance Using Logical Checkpointing in Computing Systems," which is assigned to the present assignee and which is fully and completely incorporated herein by reference.

Services 120a–120n typically provide different functions within a distributed computing system. For example, but without limitation, one service may provide a distributed, scalable, and fault-tolerant metadata service (MDS), while another may provide a distributed, scalable gateway service (GS), a distributed scalable bit file storage service (BSS), or some other service. Examples of metadata, gateway and storage services are described in U.S. patent application Ser. No. 09/709,187, entitled "Scalable Storage System," which is assigned to the present assignee, and which is fully and completely incorporated herein by reference.

Each service node 130a–130n in system 100 may also include life support service (LSS) processes 102a–102n. The LSS processes monitor the state and operability of the components and services of the distributed computing system 100 (e.g., whether each of the components is functioning properly). This state and operability information may be communicated to the SMS/boot server 116, which may utilize the information in order to place a "protected" status on certain components or nodes during the upgrade process in order to ensure that all system services and information remain available throughout the upgrade process. The use of this protected status in the upgrade procedure is more fully and completely discussed below in Section II.C. The SMS/boot server 116 may also use the state and operability information to determine how system resources should be allocated or modified to achieve certain user-selected performance attributes and functionality, as discussed in the above-referenced, co-pending U.S. Patent Application, entitled "System and Method for Managing a Distributed Computing System." The function of the LSS system is fully and completely described in co-pending United States Patent Application, entitled "System and Method for Monitoring the State and Operability of Components in Distributed Computing Systems," which is assigned to the present assignee, and which is fully and completely incorporated herein by reference.

Each service node 130a–130n in system 100 also includes an SMS agent process 101a–101n, which is a managed entity used by the SMS/boot server 116 to remotely manage a service node (e.g., to start, stop, and reboot a service node). Each agent may include fault-tolerant software loading mechanisms that can be remotely directed by the SMS/boot server 116 to load the necessary software onto the nodes. In one embodiment, the software for all nodes is stored in two separate boot server portions of the SMS/boot server 116.

It should be noted that the components of the service nodes may receive messages directly from the SMS/boot server 116 and from other components through the switching fabric 110a–110n, or alternatively, such messages may be mediated by another layer of communication software 104a–104n, according to a known or suitable mediation scheme.

In accordance with the principles of the present invention, the foregoing nodes and services are provided for purposes of illustration only and are not limiting. The resources of the system 100 may be used for any function or service, for example but not limited to, a highly scalable, fault-tolerant storage system. Furthermore, while only three services (i.e., services 120a, 120b, 120n), and two SMS/boot servers (i.e., servers 116a, 116b) are shown, many more of each of these services and servers may be connected to one another via switching fabrics, according to the present invention.

II. Operation of the System

Figure 2:
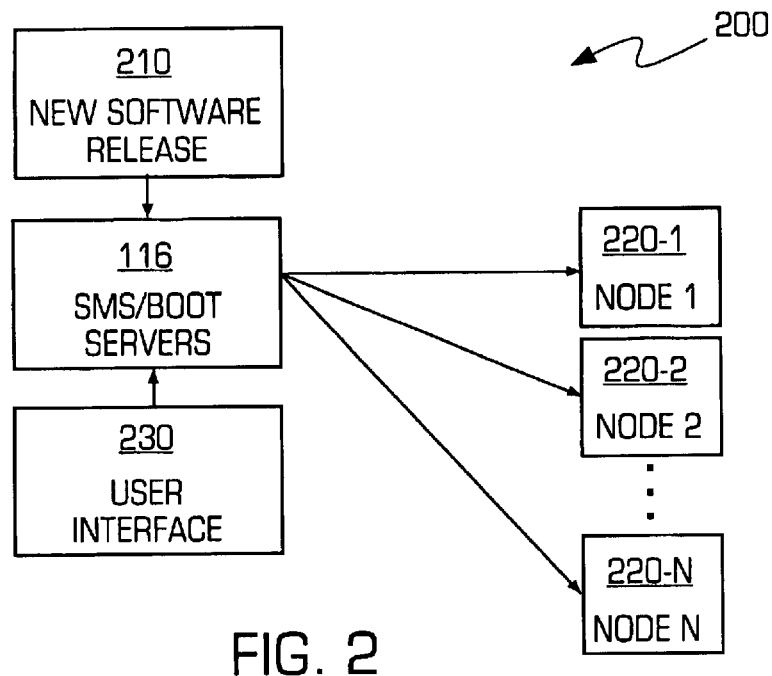
FIG. 2 is a block diagram illustrating the general operation of the system and method for performing software upgrades, according to one embodiment of the invention.

Referring now to FIG. 2, there is shown a block diagram illustrating the general operation of a system 200 for managing software upgrades in a distributed computing system, such as system 100 of FIG. 1. As shown in FIG. 2, a new software release 210 may be received by one of the SMS/boot servers 116, which will install the software on the remaining SMS/boot servers 116. The SMS/boot servers 116 will then determine whether the installed software is compatible with software presently running on all of the nodes of the system (e.g., nodes 220-1 through 220-N, which may represent nodes 130a–130n of system 100). If the software is compatible, the SMS/boot servers 116 may perform a rolling upgrade of the software by sequentially loading the new software on each node in the system (e.g., on nodes 220-1 through 220-N), in a manner which allows the system and all of its services to remain operable and available throughout the upgrade process. In one embodiment, a conventional user interface 230, such as a command line interface (CLI) or a graphical user interface (GUI), may be used to initiate or control the installation and/or rolling upgrade processes. The foregoing elements and steps, which are implemented in the management of the upgrade process, are described more fully and completely below.

A. Installing New Software Releases

Figure 3:
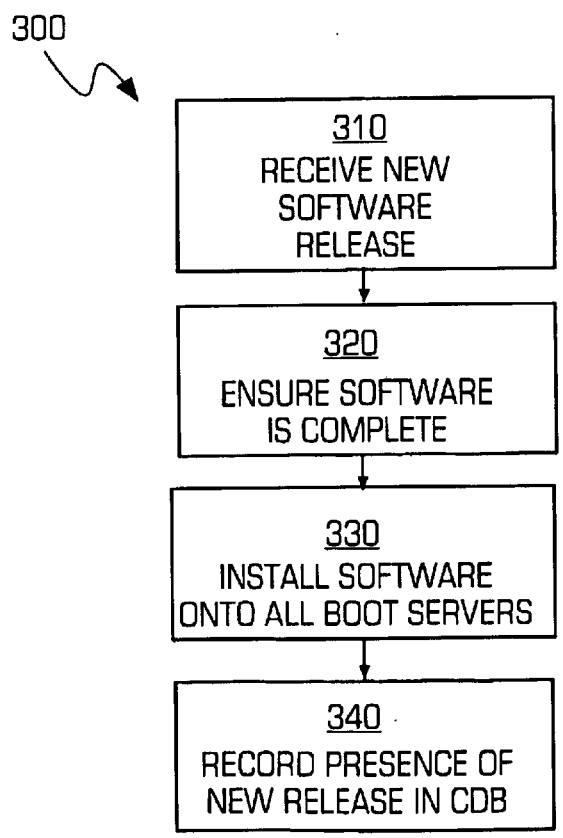
FIG. 3 is an exemplary block diagram illustrating a method for installing software onto the SMS/boot servers of the present invention, according to one embodiment of the invention.

FIG. 3 is a flow diagram 300, illustrating an exemplary method of installing new software releases on SMS/boot servers 116, according to one embodiment of the present invention. In step 310, a new software release is received by the system 100. In the preferred embodiment, a new software release or "upgrade" may be received by system 100 in any conventional manner, such as by loading the software onto one of the SMS/boot servers 116 by use of a conventional input device (e.g., a disk drive) or by uploading the software from a remote system or network (e.g., by use of an ftp transfer or other suitable transfer protocol).

Once the software is received, the SMS/boot server 116 may check the software to ensure that it is complete (e.g., that all necessary components are present) and that no other noticeable errors exist, as shown in step 320.

The new release may then be installed onto all active SMS/boot servers 116, as shown in step 330. In one embodiment, a software release may take the form of a gzip-compressed tar archive file. The release may be installed by unpacking it with a "tar-zx" command (or the equivalent cpio command, if appropriate). The release will preferably include fully qualified names, so that it installs in the correct place in a file tree. A system administration command to install software (e.g., "install_software") may be entered through an administrative interface (e.g., interface 230) to initiate or perform the installation. The implementation of the command will repeat the installation on all SMS/boot servers 116 (e.g., by copying the software from the first machine on which it is installed to the others). This may involve keeping a temporary copy on first machine until it is installed on all locations.

In the preferred embodiment, new software releases, which may include software patches are labeled with a unique identifier (e.g., a 64-bit identifier). A release may be installed in a distinct subtree on a boot server (e.g., on SMS/boot server 116a, 116b), and may not be considered suitable for further use until it has been installed on all active boot machines. For example, a new release may be stored under an assigned directory on a boot server, in a subtree corresponding to the unique identifier of the release. The subtree may include various directories which constitute a constant part of the release, such as binary and library directories. The release may contain all software, including kernel and other base system components, not just the proprietary software of the related distributed computing system. Architecture-specific components, such as executables, may be grouped under their own directories.

Each subtree may contain a file (e.g., a release identifier file) that identifies the release (e.g., as a hexadecimal string), and, on any executing machine, a file of the same name gives the current release identifier for software executing on that machine. The identity of the release(s) running on the nodes of system 100 may be maintained in a releases node or portion of the CDB 114.

After a copy of the new software is installed on each boot server, a management command records the presence of the new release by creating a node that identifies the release in the CDB 114, as shown in step 340. The node corresponding to the release that is presently being run by the system 100 may be assigned an attribute "_current", which identifies the release as the current release being run by the system 100.

Patch Releases

A new software release may also comprise a delta patch release. A delta patch release may contain a file entitled "DeltaPatchRelease". When installing a release, the SMS/boot server 116 will first look for the existence of such a file. If present, the SMS/boot server 116 will first extract the file and process it, before unpacking the release as usual. In the preferred embodiment, the file may contain lines in three formats. First, a line of the form "BaseRelase nnn" specifies the release on which the patch is based. If release "nnn" is not installed, the SMS/boot server 116 will refuse to install the patch. Otherwise, the SMS/boot server 116 will clone the base release directory tree as the tree for the patch release, and hard-link all files from the base directory tree into corresponding locations in the patch release tree. The SMS/boot server 116 will then search for lines of the form "Delete xxx", and delete files "xxx" which may be included within the patch release tree, in order to remove unnecessary files.

The SMS/boot server 116 will then search for lines of the form "Rename xxx yyy" which may be included within the patch release tree, and rename files "xxx" to "yyy" within the patch release tree, in order to conform to the new release. The SMS/boot server 116 will then proceed to unpack the release as usual. Those of ordinary skill in the art will appreciate that this process and patch configuration will enable rapid distribution of relatively small fixes via slow communication links, such as modems.

The patch may also include a "PostInstallation" script, which provides instructions for the SMS/boot server 116 to perform after an installation is complete. The SMS/boot server 116 may search for this "PostInstallation" script at the top level of the installed software, and if it is present, run it to perform any post-installation operations, such as reconstructing the boot images for the non-boot servers (to avoid having to include those images in patch releases).

Users (e.g., system administrators) may be allowed to selectively install a particular patch. Patches, however, are mutually exclusive at runtime. For example, since a given release specifies those releases from which is an upgrade, one can only change from release A to patch A1 and then patch A2 if A2 is an upgrade from A1, which is in turn an upgrade from A. In the preferred embodiment, the system will normally maintain patches cumulatively, so that each new patch is a superset of any previous patch on the same base. If branches arise, then one would normally be unable to switch from one branch to another without downgrading to a common ancestor or upgrading to a common descendant, as will be appreciated by those skilled in the art.

B. Initiating Software Upgrades

Figure 4:
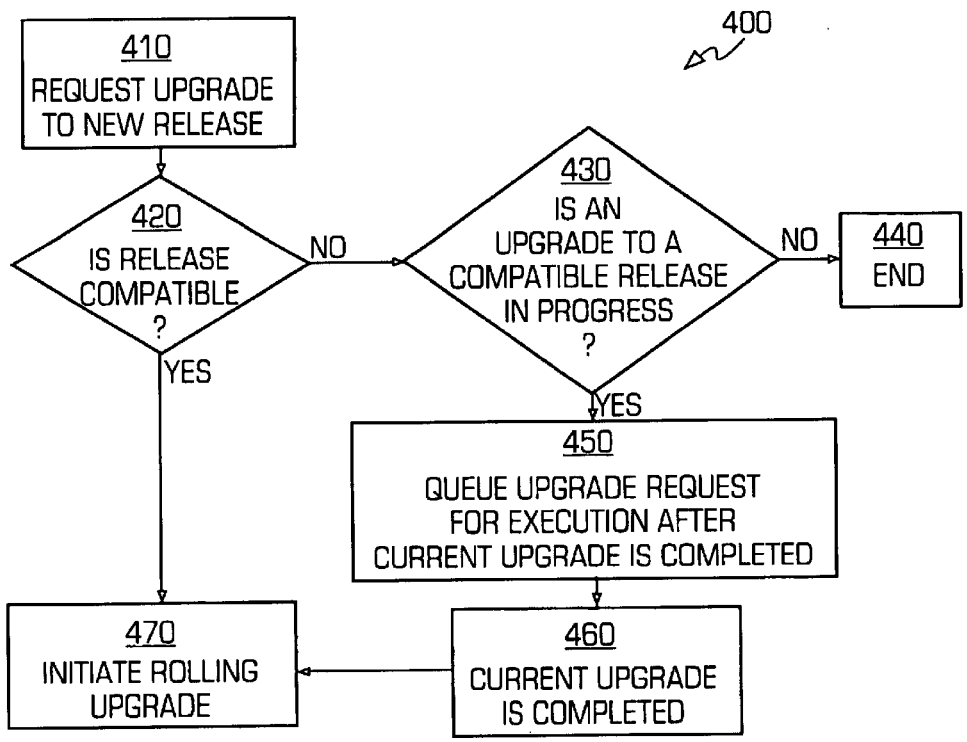
FIG. 4 is an exemplary block diagram illustrating a method for initiating a rolling upgrade, according to one embodiment of the present invention.

FIG. 4 illustrates an exemplary method 400 for initiating software upgrades that may be performed by the SMS/boot server(s) 116, according to one embodiment of the present invention. In step 410, a software upgrade is requested. In the preferred embodiment, a system administration command (e.g., "upgrade_software"), with the identifier of the release to which the system is to be upgraded as an argument, may be inputted through a conventional administrative interface (e.g., user interface 230) to request a rolling upgrade.

In the preferred embodiment, upgrade requests and status information regarding the upgrade requests are recorded and maintained in the CDB 114. Entries may be created and viewed through an administrative interface (e.g., interface 230), and may be deleted by administrative request. In one embodiment, each entry may include the following attributes:

| | |
|---|---|
| FromRelease | Hexadecimal release identifier to change from |
| ToRelease | Hexadecimal release identifier to change to |
| CancelRequested | (present only if cancellation is requested) |
| Cancelled | (present only if request has been cancelled) |
| Started | (present only if processing request has started) |
| Completed | (present only if processing request has completed) |
| Failed | (present only if processing request has failed; value is a failure status indication) |

In the preferred embodiment, "Cancelled", "Failed", and "Completed" are mutually exclusive. The system may allow a user (e.g., a system administrator) to only set attributes for "ToRelease" and "CancelRequested". The other attributes may be set during request processing (including cancellation processing). Downgrade requests are allowed, subject to constraints described below in Section II.D.

Figure 5:
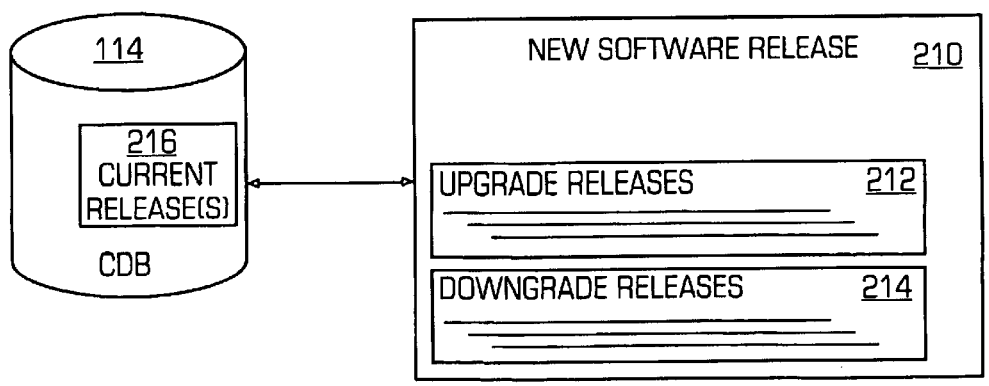
FIG. 5 is a schematic diagram illustrating the comparison between a current software release listed in a configuration database (CDB) and compatible releases listed in a new software release.

In step 420, the SMS/boot server 116 determines whether the new release or upgrade is compatible with the software presently running on the system. SMS/boot server 116 may perform this step by comparing compatibility information contained in the new software release to the identity of the software release(s) that is currently running on the system. FIG. 5 illustrates how this comparison may be performed in one embodiment of the invention. Information relating to the software release(s) currently running on the system may be contained in a current releases portion 216 of the CDB 114, as shown in FIG. 5. Furthermore, each new software release may include an "UpgradeReleases" file 212, which identifies each release with which the new software is upward compatible, and a "DowngradeReleases" file 214, which identifies each release with which the new software is downward compatible. Each line in the "UpgradeReleases" file 212 may contain the unique identifier of a compatible release (e.g., in hexadecimal). The SMS/boot server 116 may compare the current release(s) to the compatible releases contained in the "UpgradeReleases" file. The SMS/boot server 116 will not accept a request to upgrade from one software release to another if the current release(s) running on each node in the system (and identified in the CDB 114) is not identified as a compatible release.

If each node of the system is not running a compatible release, the SMS/boot server 116 will check the CDB 114 to determine whether a request to upgrade to a compatible release is in progress, as shown in step 430. If such a request is not in progress, the upgrade procedure will terminate, as shown in step 440. If, however, the SMS/boot server 116 detects that an upgrade request to a compatible release is in progress, an upgrade request to the new release may be queued for execution after the current upgrade is completed, as shown in step 450. After the request in progress is completed, as shown in step 460, the SMS/boot server will initiate the rolling upgrade procedure, as shown in step 470.

In this manner, the system will not execute a rolling upgrade if any element of the system is not running software which is either upward compatible with or identical to the desired release. If and/or when the new release is and/or becomes compatible with the current release, the rolling upgrade procedure is initiated, as shown in step 470.

In one embodiment, a user may also request the cancellation of an upgrade by use of a system administration command (e.g., "cancel_software_change"), identifying the sequence number of the request as an argument. In one embodiment, cancellation will only take effect if processing of the request has not yet started, i.e., only if the rolling upgrade has not been initiated in step 470. A system administration command, "remove_software", with the identifier of the release as an argument, may be used to remove installed software. The command will refuse to remove a release which is marked as the currently selected software, or which any boot machine is currently executing.

C. Performing Rolling Software Upgrades

Figure 6:
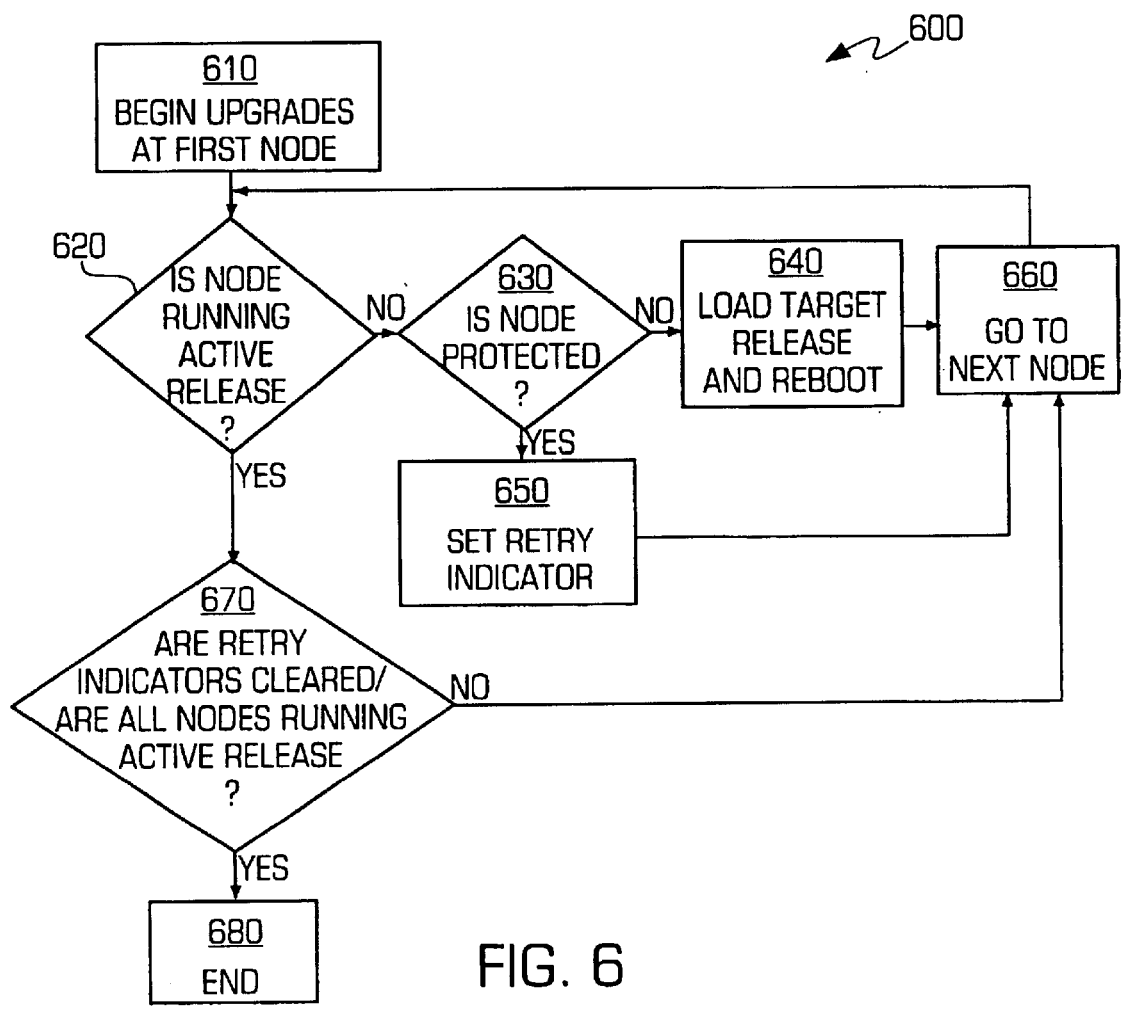
FIG. 6 is an exemplary block diagram illustrating a method for performing rolling software upgrades, according to one embodiment of the invention.

FIG. 6 illustrates an exemplary method 600, which may be implemented by SMS/boot server 116 to upgrade software on a distributed computing system, according to one embodiment of the present invention. As shown in method 600, SMS/boot server 116 upgrades the software on the system in a rolling or sequential manner, i.e., node by node. In step 610, the SMS/boot server 116 begins the upgrade process with a first node, which may represent any one of nodes 130a–130n of system 100 illustrated in FIG. 1. The SMS/boot server 116 determines whether the selected node is running the active release of the software (i.e., the new or upgrade release), as shown in step 620. This information may be obtained by communication with the node itself or by searching the appropriate area of the CDB 114 (e.g., the "hosts" section of the CDB 114, which maintains the attributes and status of the various nodes of system 100). If the selected node is not running the active release, the SMS/boot server 116 proceeds to step 630 and determines whether the selected node has been "protected".

The "protected" status may be assigned and stored as an attribute of the nodes under the "hosts" section of the CDB 114. Protected status may be assigned to a node to temporarily protect the node from rebooting if the node contains the only active copy of a fault-tolerant service or data. In this context, the terms fault-tolerant "service" and fault-tolerant "data" may be used interchangeably. For example, a service, such as a bit file storage service (BSS), will comprise data, such as a plurality of data files. If a copy of any of the service or its data is determined to be the only copy left, then the service/data will be considered to have lost its fault-tolerant status.

The "protected" status may be activated and maintained by use of the LSS and the SMS/boot server 116 (and/or by other management entities, such as agents of the SMS). In the preferred embodiment, protected status is assigned to protect any service or data that has lost its duplicate or backup copy within the system (i.e., lost its fault-tolerant status). Particularly, the LSS monitors the status of the various nodes, resources and services of the system 100. If any node, resource or service fails or becomes unavailable, the LSS notifies the SMS/boot server 116 (e.g., by updating a relational table). The SMS/boot server 116 then determines which service(s) and/or data are no longer available. For example, if a particular node has failed, the SMS/boot server 116 determines which services and/or data were provided by or stored on the failed node. (This information may be stored within one or more relational tables or matrixes within the CDB 114). The SMS/boot server 116 then locates the corresponding node(s) that provides and/or stores the surviving copy or instance of the disabled service(s) and/or data (e.g., by use of the one or more relational tables or matrixes within the CDB 114), and assigns a protected status to all nodes which provide or store the surviving copy of the service or data. For example and without limitation, if a bit file storage service (BSS) disk fails, the LSS system will notify the SMS/boot server 116, which will protect the disk(s) containing the surviving copy of the stored data, thereby preventing the reboot of any node containing any of the data until fault tolerance is restored. In this manner, no service or data provided by the distributed computing system will be unavailable during the rolling upgrade process (i.e., at least one copy of all services and data will always remain available).

Referring back to FIG. 6, if the node is not protected in step 630, the SMS/boot server 116 loads the new or target software release onto the node and reboots the node, thereby upgrading the node to the target software, as shown in step 640. If the node is protected, the SMS/boot server 116 does not attempt to upgrade the node, but rather sets a retry indicator, as shown in step 650. The retry indicator may be stored in the CDB 114 and may identify the protected node. The retry indicator is effective to notify the SMS/boot server 116 that the node was not upgraded and that the upgrade process is not complete. Once the node has been rebooted (i.e., during a software upgrade), the retry indicator will be cleared. Following the upgrade of a node (e.g., step 640) or the setting of a retry indicator (e.g., step 650), SMS/boot server 116 proceeds to the "next" node in the system, as shown in step 660. The SMS/boot server 116 will then repeat steps 620–660.

The "next" node referred to in step 660 may be selected in any manner, based on any suitable or desired priority system. In one embodiment, an administrator may specify an ordering of upgrades of components through an administrative interface (e.g., interface 230). For example, an administrator might select to upgrade all of one class of component, such as a BSS, before upgrading other classes of components.

If, in step 620, the SMS/boot server 116 detects that the selected node is running the active software release, it proceeds to step 670. The SMS/boot server 116 then determines whether all retry indicators are "off" or cleared and whether all nodes in the system are running the active release. The SMS/boot server 116 may perform this step by checking the CDB 114. If the SMS/boot server 116 detects that one or more retry indicators are set or that any nodes are not running the active release, it proceeds to the next node (step 660), and repeats steps 620–670. Once all the retry indicators are "off" and all nodes are running the active release, the upgrade procedure will terminate, as shown in step 680.

The presence of failed servers does not affect the upgrade process, as long as the SMS/boot server 116 and CDB 114 are properly updated. Particularly, the SMS/boot server 116 will effectively "skip over" or ignore any failed servers during the upgrade process. However, it should be appreciated that if a failed server contains one of two instances of a service or data, the failure of that node will cause any other node providing the surviving copy of the service or data to be "protected". If the failed server is down for an extended period of time (e.g., more than some predetermined period of time), the SMS/boot server 116 may replace it with a spare machine or node, by copying all of the information from the active node(s) to the new node(s), and then rebooting the new node(s) with the upgraded software.

D. Downgrade Requests

Downgrade requests may be entered via the system administration command "downgrade_software", with a release identifier as its argument. The downgrade process is substantially similar to the afore-described upgrade process. Specifically, the SMS/boot sever 116 will only initiate the downgrade request if the request is for a release which is compatible with the presently operating software. This may be determined by comparing the target release to information contained in the presently running release. Particularly, each software release may include a "DowngradeReleases" file in the top of its subtree (e.g., in the same format as the "UpgradeReleases" file), providing the set of release identifiers to which it may be downgraded. If the downgrade request is for a release that is found in the "DowngradeReleases" file, the SMS/boot server 116 will initiate the downgrade request.

The SMS/boot server 116 will perform the downgrade in a sequential or rolling manner (e.g., in a manner substantially similar to method 600). That is, the SMS/boot server 116 will downgrade each node in the system, one at a time, and will "skip over" any "protected" nodes. The SMS/boot server 116 will set a retry indicator for the protected nodes, and will continue the process until all nodes have been downgraded. In one embodiment, a given node is downgraded by shutting down all services on the node other than the LSS and the SMS Agent, and then executing a "downgrade-release" script with the target release identifier as an argument. The "downgrade-release" script is effective to downgrade the software to the target release. Once the "downgrade-release" script has completed, it signals completion by making an update in a table (e.g., a "ReleaseLevel" table) within the LSS, giving the destination release level, and then "shuts down" the node. When the SMS/boot server 116 notices that the node has shutdown, it records the node as being at the target release level (e.g., within the CDB 114), conveys that information to the boot servers, and reboots the machine. In the case of a boot machine, the downgrade script adjusts the boot machine's own configuration to use the new release on next boot before shutting down the system.

In this manner, the present invention provides a system and method for managing software upgrades in a distributed computing system that performs software upgrades on a node by node basis, in a manner which allows all services and data provided by the distributed computing system to remain available throughout the upgrade process. The system and method will automatically protect any node that provides the only instance of a service or data during the upgrade process, thereby preventing the node from being rebooted until fault tolerance is restored. In this manner, all services and information will remain available during the upgrade process. In a similar manner, the present invention is further able to perform software downgrades throughout the system in a manner which allows the system and all of its components to remain available throughout the downgrade process.

Although the present invention has been particularly described with reference to the preferred embodiments thereof, it should be readily apparent to those of ordinary skill in the art that changes and modifications in the form and details may be made without departing from the spirit and scope of the invention. For example, it should be understood that Applicant's invention is not limited to the exemplary methods that are illustrated in FIGS. 3, 4 and 6. Additional or different steps and procedures may be included in the methods, and the steps of the methods may be performed in any order suitable to achieve rolling upgrades while allowing the distributed computing and its components to remain available. It is intended that the appended claims include such changes and modifications. It should be further apparent to those skilled in the art that the various embodiments are not necessarily exclusive, but that features of some embodiments may be combined with features of other embodiments while remaining with the spirit and scope of the invention.

What is claimed is:

1. A system for managing a software upgrade in a distributed computing system having a plurality of nodes that provides a plurality of fault-tolerant services, wherein a first set of nodes providing a first fault-tolerant service can differ from, yet can also overlap with, a second set of nodes providing a second service, and wherein making an upgrade current on a given node can take an amount of time sufficient to be considered a fault if not otherwise masked by fault-tolerance, the system comprising:

at least one node which is communicatively connected to the plurality of nodes and which is configured to receive a software release, and to upgrade each of the plurality of nodes with the software release in a sequential manner, accounting for the possibility of different versions of software running on different nodes of the system, whereby the plurality of fault-tolerant services remain available while the software upgrade is in progress a service which is configured to notify the at least one node when a first copy of fault-tolerant service becomes unavailable; and wherein the at least one node is configured to assign a protected status to a node including any portion of a surviving copy of the fault-tolerant service, the protected status being effective to prevent the node from being upgraded.

2. The system of claim 1 wherein service is further configured to notify the at least one node when the first copy of the fault-tolerant service is restored, and wherein the at least one node is configured to remove the protected status of the affected nodes once fault-tolerant status is restored.

3. The system of claim 1 wherein the at least one node is further configured to determine whether the software release is compatible with the current software running on the plurality of nodes and to upgrade the plurality of nodes only if the software release is compatible with the current software.

4. The system of claim 3 further comprising:

a configuration database which is communicatively coupled to the at least one node and which stores information regarding the plurality of nodes.

5. The system of claim 4 wherein the at least one node compares compatibility information contained in the software release to information identifying the current software running on the plurality of nodes, which is stored in the configuration database, to determine whether the software release is compatible with the current software running on the plurality of nodes.

6. The system of claim 3 wherein the at least one node is further configured to detect when a first upgrade to a compatible software is in progress, and to upgrade the plurality of nodes to the software release once the first upgrade is complete.

7. The system of claim 1 wherein the at least one node is configured to upgrade a node by loading the software upgrade onto the node and rebooting the node.

8. The system of claim 1 wherein the at least one node which upgrades the nodes in the system includes a first node and at least one second node, wherein the first node has primary responsibility for performing upgrades and wherein the at least one second node acts as a backup.

9. The system of claim 1 further comprising a plurality of agents which are respectively disposed on the plurality of nodes and which are configured to assist in upgrading the nodes with the software upgrade under remote control of the at least one node.

10. The system of claim 1 further comprising an interface which is communicatively connected to the at least one node, and which is configured to allow a user to enter an upgrade request, effective to cause the at least one node to initiate an upgrade to the software release.

11. The system of claim 10 wherein the interface is further configured to allow a user to enter a downgrade request, effective to cause the at least one node to downgrade the software currently running on the plurality of nodes in a sequential manner, whereby none of the fault-tolerant services becomes unavailable while the downgrade is in progress.

12. A method for managing a software upgrade in a distributed computing system having a plurality of nodes that provide a plurality of fault-tolerant services, wherein a first set of nodes providing a first fault-tolerant service can differ from, yet can also overlap with, a second set of nodes providing a second service, and wherein making an upgrade current on a given node can take an amount of time sufficient to be considered a fault if not otherwise masked by fault-tolerance, the method comprising the steps of:

receiving a new software release;

upgrading each of the plurality of nodes with the new software release in a sequential manner, accounting for the possibility of different versions of software running on different nodes of the system, whereby the plurality of fault-tolerant services remains available while the software upgrade is in progress determining whether a first copy of a fault-tolerant service has become unavailable; and preventing any node having a surviving copy of the fault-tolerant service from being upgraded while the first copy of the fault-tolerant service is unavailable.

13. The method of claim 12 further comprising the steps of:

detecting that a previously unavailable copy of a fault-tolerant service has recovered; and upgrading any node having the surviving copy of the fault-tolerant service.

14. The method of claim 12 further comprising the step of:

determining whether the new software release is compatible with a current software release that is being run on the distributed computing system; and performing the software upgrade only if the new software release is compatible with the current software release that is being run on the distributed computing system.

15. The method of claim 14 further comprising the step of:

determining whether a first software upgrade to a compatible new software release is in progress;

waiting for the first software upgrade to be completed; and performing a second software upgrade to another software release.

16. The method of claim 12 wherein the step of upgrading a node includes loading the new software release onto the node and rebooting the node.

17. The method of claim 12 wherein the new software release comprises a patch release.

18. A method for managing a software upgrade in a distributed file system having a plurality of nodes, which provide a plurality of fault-tolerant services, wherein a first set of nodes providing a first fault-tolerant service can differ from, yet can also overlap with, a second set of nodes providing a second service, and wherein making an upgrade current on a given node can take an amount of time sufficient to be considered a fault if not otherwise masked by fault-tolerance, comprising:

receiving a new software release;

determining whether the new software release is compatible with a current release running on the distributed file system;

initiating a rolling upgrade process if the new software release is compatible;

performing the rolling upgrade process by sequentially loading and rebooting each of the plurality of nodes with the new software release;

accounting for the possibility of different versions of software running on different nodes of the system; and ensuring that the plurality of fault-tolerant services remains available throughout the rolling upgeade process services remains available throughout the rolling upgrade process includes the steps of:

determining whether a first copy of a fault-tolerant service has become unavailable; and preventing any node having a surviving copy of the fault-tolerant service from being upgraded while the first copy of the fault-tolerant service is unavailable.

19. The method of claim 18 wherein the plurality of fault-tolerant services includes services selected from the group consisting of bit file storage services, metadata services and gateway services.

* * * * *